United States Patent
Yokoyama et al.

(10) Patent No.: US 11,155,290 B2
(45) Date of Patent: Oct. 26, 2021

(54) HANDCART

(71) Applicant: TOSHIBA TEC KABUSHIKI KAISHA, Tokyo (JP)

(72) Inventors: Yukiko Yokoyama, Sunto Shizuoka (JP); Takahiro Saitou, Izunokuni Shizuoka (JP); Masachika Kurata, Mishima Shizuoka (JP); Noriyoshi Hara, Mishima Shizuoka (JP); Hitoshi Iizaka, Fuji Shizuoka (JP); Hidehiro Naito, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 312 days.

(21) Appl. No.: 16/290,416

(22) Filed: Mar. 1, 2019

(65) Prior Publication Data

US 2019/0270469 A1    Sep. 5, 2019

(30) Foreign Application Priority Data

Mar. 2, 2018    (JP) .............................. JP2018-037823

(51) Int. Cl.
*B62B 3/14* (2006.01)
*B62B 5/00* (2006.01)

(52) U.S. Cl.
CPC .......... *B62B 3/1412* (2013.01); *B62B 3/1424* (2013.01); *B62B 5/0006* (2013.01); *B62B 5/0096* (2013.01); *B62B 2202/61* (2013.01)

(58) Field of Classification Search
CPC ... B62B 3/1412; B62B 5/0096; B62B 5/0006; B62B 3/1424; B62B 2202/61
See application file for complete search history.

(56) References Cited

U.S. PATENT DOCUMENTS

| 5,361,871 A | * | 11/1994 | Gupta | .................. B62B 3/1428 186/61 |
| 5,769,435 A | * | 6/1998 | Nishida | ..................... B62B 3/14 280/33.991 |
| 5,773,954 A | * | 6/1998 | VanHorn | .............. G07G 1/0045 320/137 |
| 5,821,512 A | * | 10/1998 | O'Hagan | ........... G06K 17/0022 235/383 |

(Continued)

FOREIGN PATENT DOCUMENTS

WO    WO-2010144054 A1 * 12/2010 ........... B62B 3/1412

*Primary Examiner* — Jacob B Meyer
(74) *Attorney, Agent, or Firm* — Kim & Stewart LLP

(57) ABSTRACT

A stackable handcart includes a cart frame, a display, and a restriction member. The cart frame includes a receiving portion on which a shopping basket is placeable and a front end portion that abuts a first stackable handcart when the stackable handcart is stacked with the first stackable handcart from behind the first stackable handcart. The display is attached to the cart frame. The restriction member is attached to the cart frame at a position to abut a front end portion of a second stackable handcart when the second stackable handcart is stacked with the stackable handcart from behind the stackable handcart. The restriction member is positioned such that a display of the second stackable handcart does not abut the display of the stackable handcart when the front end portion of the second stackable handcart abuts the restriction member.

19 Claims, 6 Drawing Sheets

(56) References Cited

U.S. PATENT DOCUMENTS

| | | | | |
|---|---|---|---|---|
| 6,119,935 A * | 9/2000 | Jelen | H02J 7/0045 | 235/383 |
| 6,168,079 B1 * | 1/2001 | Becker | G07F 7/02 | 235/383 |
| 6,314,406 B1 * | 11/2001 | O'Hagan | G06Q 30/0235 | 705/14.23 |
| 7,660,747 B2 * | 2/2010 | Brice | G06Q 30/0635 | 705/14.63 |
| 7,944,354 B2 * | 5/2011 | Kangas | G06Q 30/00 | 340/568.5 |
| 8,152,062 B2 * | 4/2012 | Perrier | B62B 3/1416 | 235/383 |
| D701,862 S * | 4/2014 | Lee | D14/420 | |
| 8,944,441 B2 * | 2/2015 | Araya Moreno | B62B 3/001 | 280/33.992 |
| 8,998,218 B1 * | 4/2015 | Bitondo | B62B 3/1488 | 280/33.992 |
| 9,809,243 B2 * | 11/2017 | Chen | H01R 13/6275 | |
| 9,969,415 B2 * | 5/2018 | Chen | B62B 3/1428 | |
| 10,759,459 B2 * | 9/2020 | Kurata | B62B 3/1416 | |
| 2002/0194075 A1 * | 12/2002 | O'Hagan | G06Q 20/202 | 705/21 |
| 2005/0035198 A1 * | 2/2005 | Wilensky | B62B 3/1424 | 235/383 |
| 2006/0007191 A1 * | 1/2006 | Chi | B62B 3/1424 | 345/184 |
| 2006/0208072 A1 * | 9/2006 | Ku | G07G 1/0081 | 235/383 |
| 2007/0008068 A1 * | 1/2007 | Brice | B62B 3/1424 | 340/5.91 |
| 2009/0033067 A1 * | 2/2009 | Coelho | B62B 1/14 | 280/651 |
| 2009/0140850 A1 * | 6/2009 | Kangas | G06Q 30/00 | 340/539.1 |
| 2010/0264205 A1 * | 10/2010 | Iida | B62B 3/1408 | 235/375 |
| 2012/0267867 A1 * | 10/2012 | Araya Moreno | B62B 3/001 | 280/47.11 |
| 2012/0284132 A1 * | 11/2012 | Kim | G07G 1/0081 | 705/20 |
| 2012/0296751 A1 * | 11/2012 | Napper | G06Q 20/208 | 705/23 |
| 2015/0032559 A1 * | 1/2015 | Sonnendorfer | H04M 1/04 | 705/21 |
| 2015/0112825 A1 * | 4/2015 | Konishi | G07G 1/12 | 705/23 |
| 2015/0206121 A1 * | 7/2015 | Joseph | B62B 3/1496 | 705/23 |
| 2016/0207557 A1 * | 7/2016 | Olivieri | B62B 3/1428 | |
| 2017/0361857 A1 * | 12/2017 | Chen | B62B 3/04 | |
| 2019/0034897 A1 * | 1/2019 | Gao | G07G 1/0036 | |
| 2019/0073656 A1 * | 3/2019 | Joseph | G06Q 20/40145 | |
| 2019/0176864 A1 * | 6/2019 | Hara | G01H 11/06 | |
| 2019/0270469 A1 * | 9/2019 | Yokoyama | B62B 5/0096 | |
| 2019/0270470 A1 * | 9/2019 | Kurata | B62B 3/1424 | |
| 2019/0272399 A1 * | 9/2019 | Iizaka | G06K 7/1413 | |
| 2019/0272400 A1 * | 9/2019 | Naito | B62B 3/1412 | |
| 2020/0122762 A1 * | 4/2020 | Kato | B62B 3/1416 | |
| 2020/0139997 A1 * | 5/2020 | Yokoyama | G06Q 20/18 | |
| 2020/0172140 A1 * | 6/2020 | Yokoyama | B62B 5/0053 | |
| 2020/0298898 A1 * | 9/2020 | Ogishima | H02J 50/10 | |
| 2020/0302509 A1 * | 9/2020 | Kishimoto | G06K 7/10297 | |
| 2020/0303953 A1 * | 9/2020 | Oishi | H01F 30/04 | |
| 2020/0327289 A1 * | 10/2020 | Iizaka | G06K 7/10722 | |
| 2021/0001741 A1 * | 1/2021 | Miyoshi | H02J 50/40 | |
| 2021/0001910 A1 * | 1/2021 | Enomoto | H02J 50/12 | |
| 2021/0001911 A1 * | 1/2021 | Kogoshi | H02J 50/10 | |

* cited by examiner

HANDCART

CROSS-REFERENCE TO RELATED APPLICATION

This application is based upon and claims the benefit of priority from Japanese Patent Application No. 2018-037823, filed on Mar. 2, 2018, the entire contents of which are incorporated herein by reference.

FIELD

An embodiment described herein relates generally to a handcart.

BACKGROUND

In a large retail store such as a supermarket and a shopping mall, a customer generally can use a shopping cart. The shopping cart is typically stackable, and a plurality of shopping carts can be stacked in a one-way direction, e.g., front-rear direction, of the shopping cart. The shopping carts can be placed in a cart storage area in the store in a stacked state.

In some stores, a scanner may be provided on a stackable shopping cart and a customer may uses the scanner for commodity registration. In such a shopping cart, devices mounted on the shopping cart may interfere with another shopping cart when stacked.

DETAILED DESCRIPTION

According to an embodiment, a stackable handcart includes a cart frame, a display, and a restriction member. The cart frame includes a receiving portion on which a shopping basket is placeable and a front end portion that abuts a first stackable handcart having a same configuration as the stackable handcart when the stackable handcart is stacked with the first stackable handcart from behind the first stackable handcart. The display is attached to the cart frame. The restriction member is attached to the cart frame at a position to abut a front end portion of a second stackable handcart having a same configuration as the stackable handcart when the second stackable handcart is stacked with the stackable handcart from behind the stackable handcart. The restriction member is positioned such that a display of the second stackable handcart does not abut the display of the stackable handcart when the front end portion of the second stackable handcart abuts the restriction member.

According to an embodiment, a stackable handcart includes a cart frame, a code reader, and a restriction member. The cart frame includes a receiving portion on which a shopping basket is placeable and a front end portion that abuts a first stackable handcart having a same configuration as the stackable handcart when the stackable handcart is stacked with the first stackable handcart from behind the first stackable handcart. The code reader is attached to the cart frame. The restriction member is attached to the cart frame at a position to abut a front end portion of a second stackable handcart having a same configuration as the stackable handcart when the second stackable handcart is stacked with the stackable handcart from behind the stackable handcart. The restriction member is positioned such that a code reader of the second stackable handcart does not abut the code reader of the stackable handcart when the front end portion of the second stackable handcart abuts the restriction member.

An embodiment is described with reference to the accompanying drawings. A shopping cart used in a store such as a supermarket and usable as a register as well including a scanner is described as an example of a handcart. In particular, the shopping cart in the present embodiment is not originally designed as a shopping cart usable as a register as well. A shopping cart, having a function of a handcart, to which an electrical component is subsequently added, can be used as the shopping cart according to the embodiment.

Figure 1:
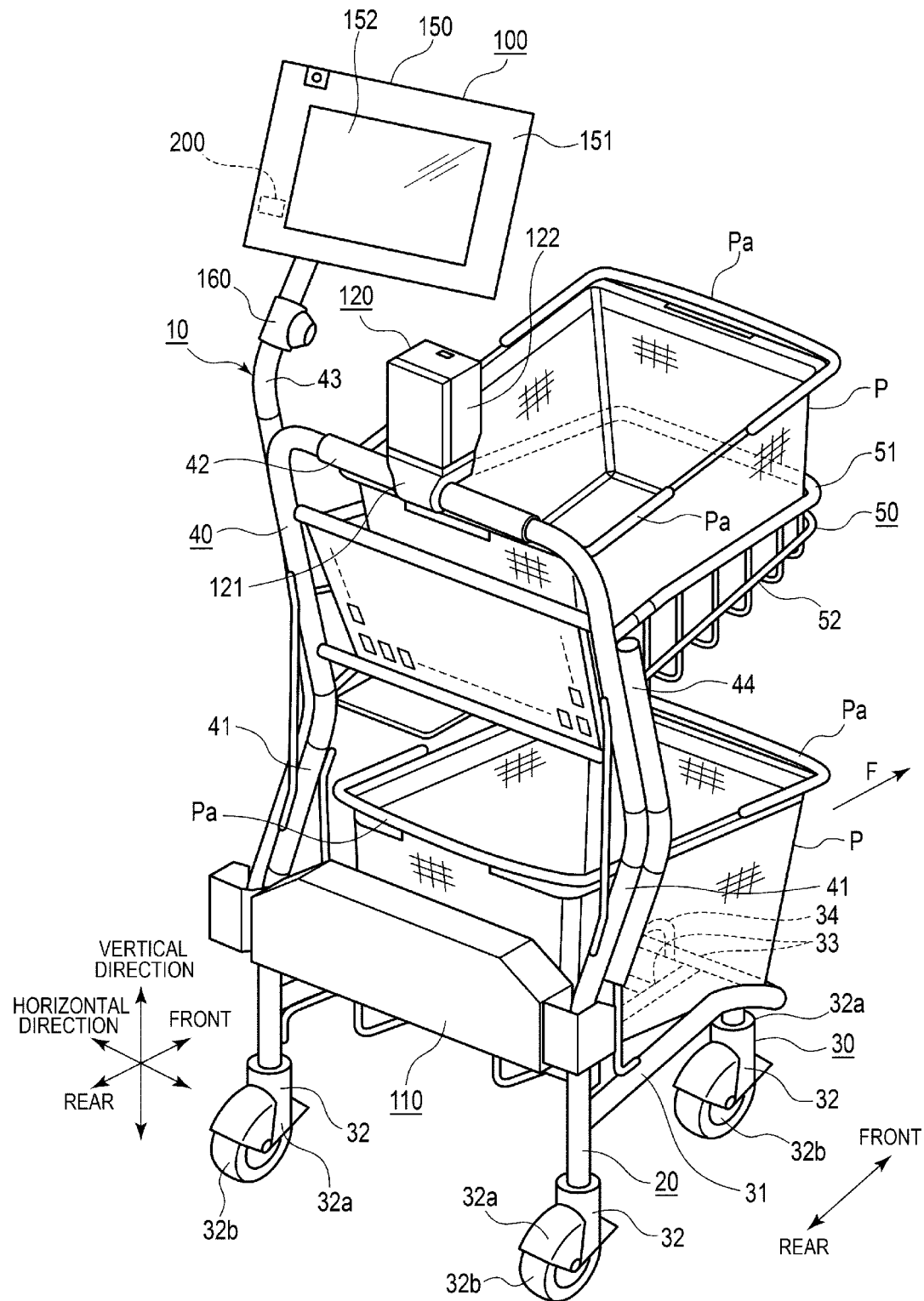
FIG. 1 illustrates a perspective view of a shopping cart according to an embodiment.
Figure 2:
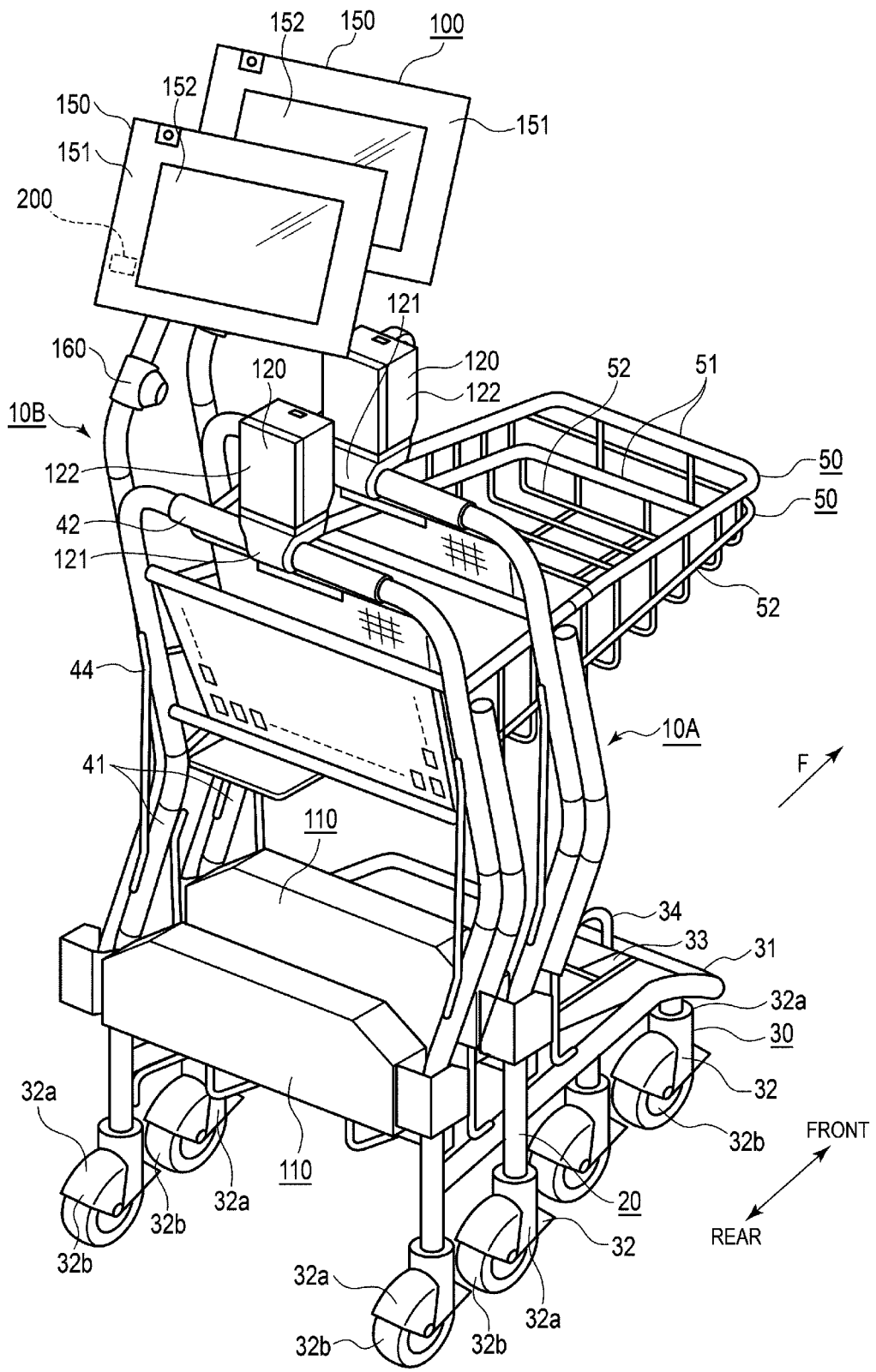
FIG. 2 illustrates a perspective view of shopping carts according to the embodiment in a stacked state.
Figure 3:
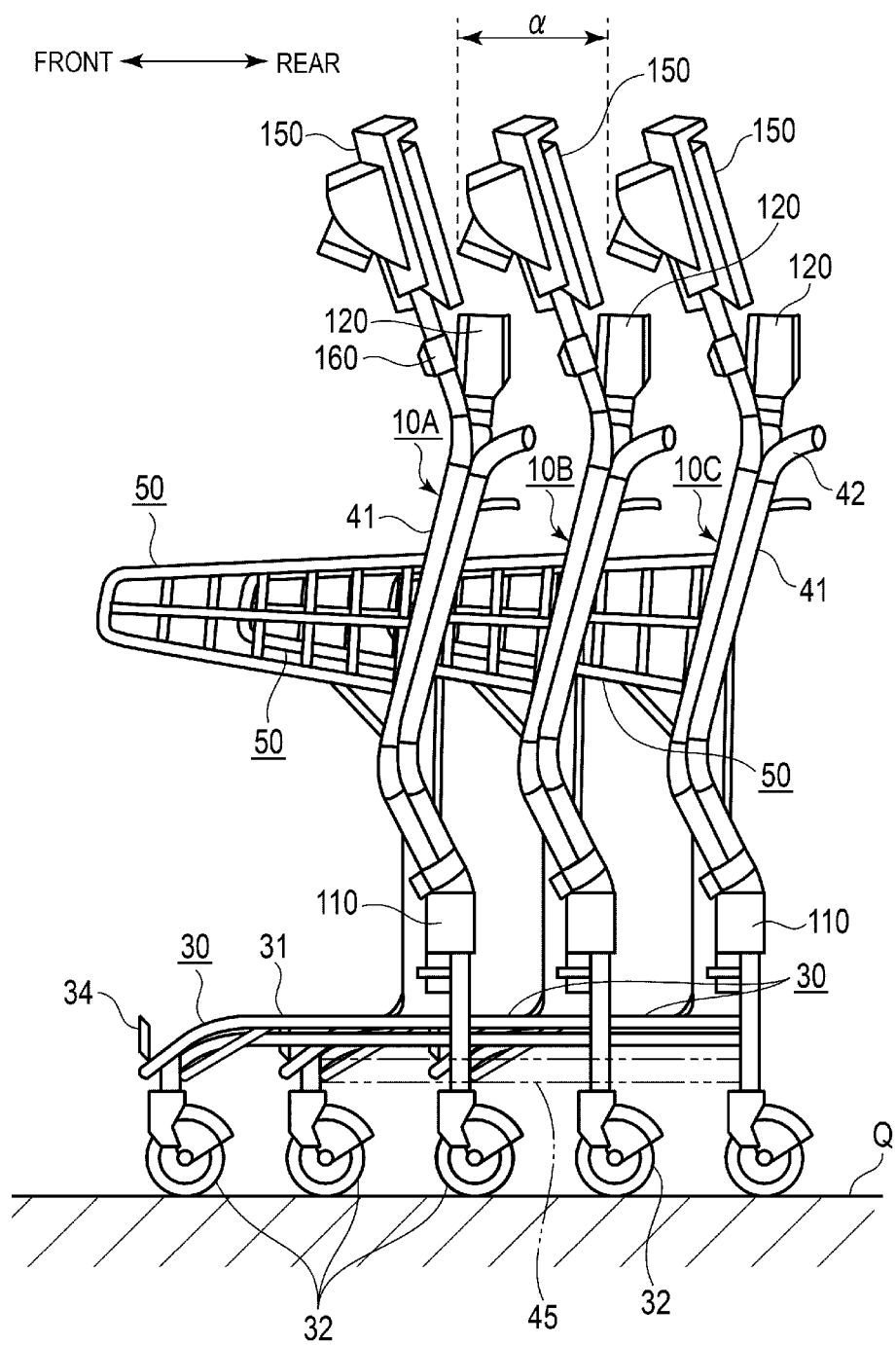
FIG. 3 illustrates a side view of the shopping carts in the stacked state.
Figure 4:
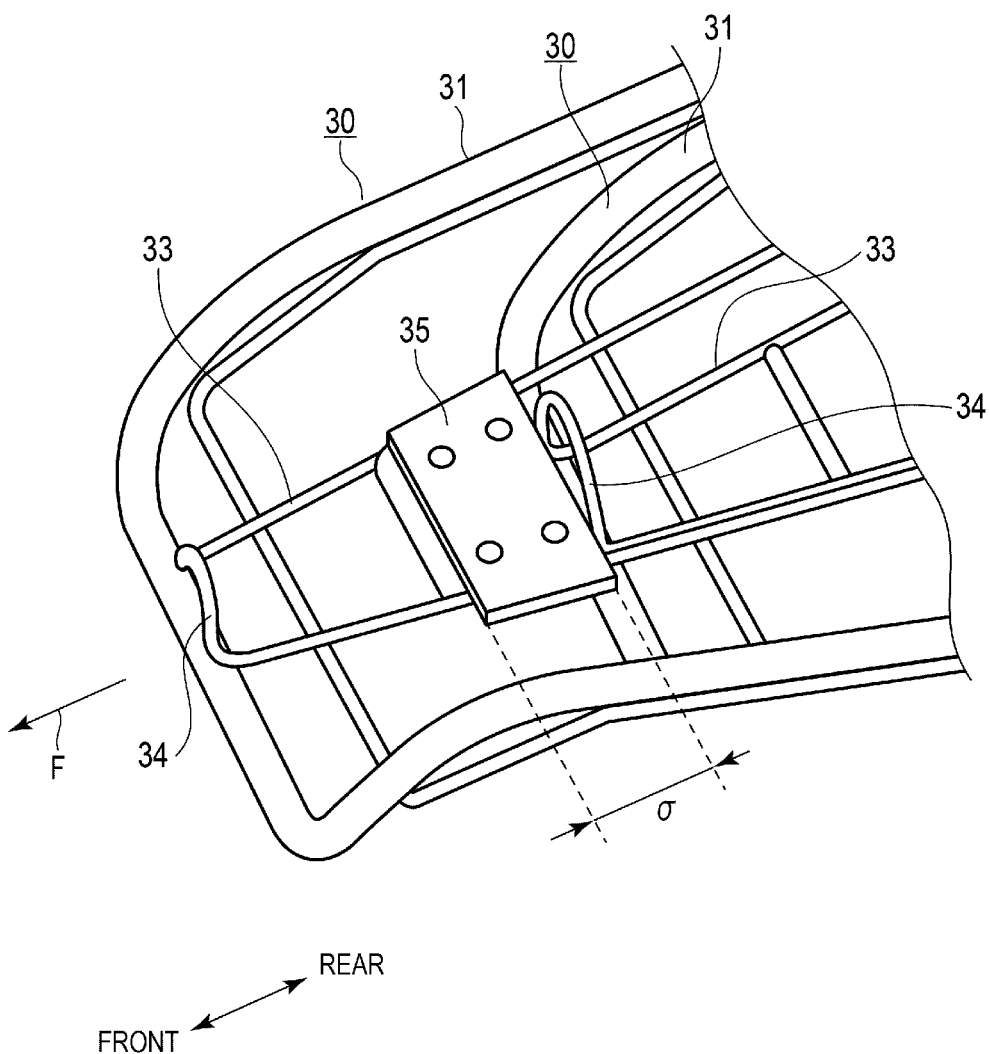
FIG. 4 illustrates a perspective view of a main part of a base frame in the shopping cart.
Figure 5:
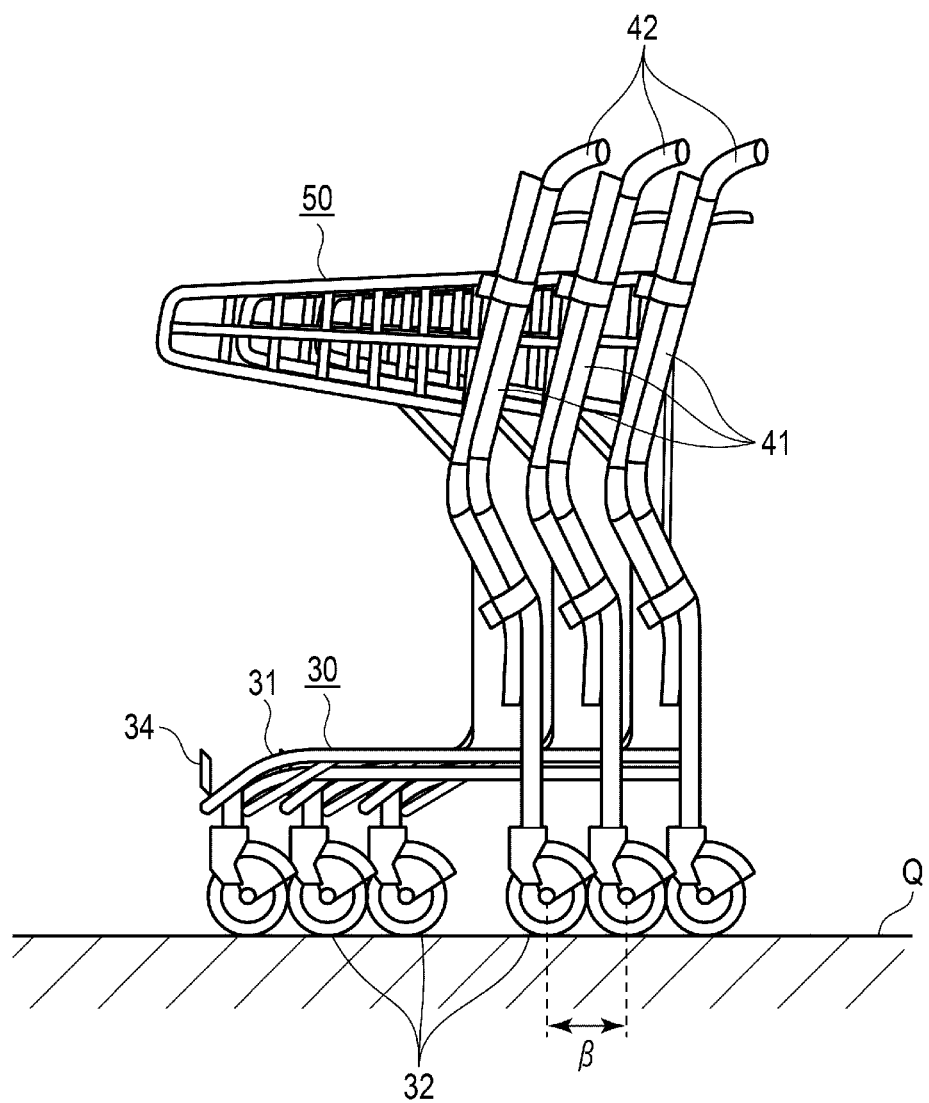
FIG. 5 illustrates a side view normal shopping carts in a stacked state.
Figure 6:
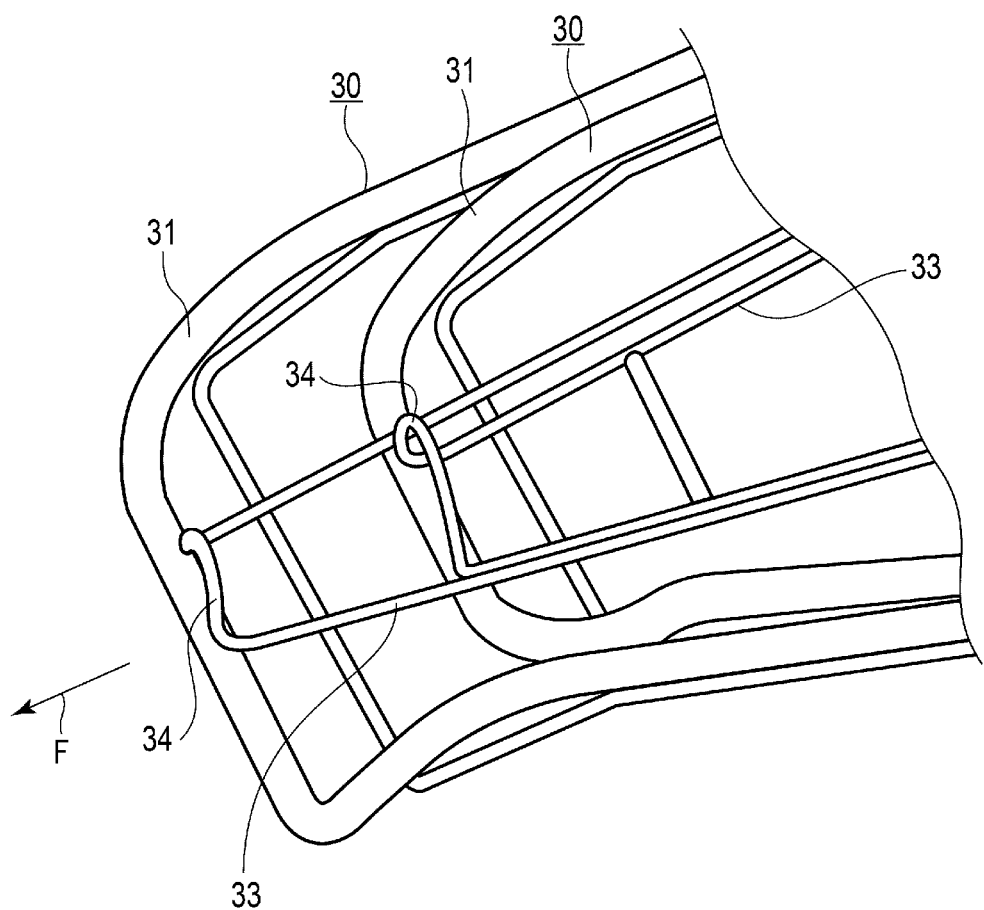
FIG. 6 illustrates a perspective view of a main part of a base frame in the normal shopping cart.

FIG. 1 illustrates a perspective view of a shopping cart 10. FIG. 2 illustrates a perspective view of shopping carts according to the embodiment in a stacked state. FIG. 3 illustrates a side view of the shopping carts in the stacked state. FIG. 4 illustrates a perspective view of a main part of a base frame in the shopping cart. FIG. 5 illustrates a side view of normal shopping carts in the stacked state. FIG. 6 illustrates a perspective view of a main part of a base frame in the normal shopping cart. A "Q" in the figures indicates a floor surface. In the present embodiment, a side of a handle frame section 40 is referred to as a rear direction and a side of a basket receiving section 50 projecting from the handle frame section 40 is referred to as a front direction. The front direction and the rear direction are collectively referred to as a front-rear direction.

In the present embodiment, a stacking state indicates, as illustrated in FIG. 1, that a plurality of shopping carts 10 are aligned in a row along the front-rear direction such that the distal end side (front side) of the shopping cart 10 located at the rear side is pushed into the rear side, i.e., handle frame section 40, of the shopping cart 10 located at the front side. The shopping cart 10 has a structure, for example, in which a part at the rear side thereof is open. Even if the plurality of shopping carts 10 are aligned in a row, total length of the aligned shopping carts 10 along the front-rear direction can be reduced. A large accommodating capacity of the shopping carts 10 can be achieved.

As illustrated in FIG. 1, the shopping cart 10 according to the present embodiment includes a cart section 20 for carrying a shopping basket P in which commodities are taken, and an electrical unit 100 attached to the cart section 20. The electrical unit 100 is detachable from the cart section 20 according to necessity. Even if the electrical unit 100 is not attached, the cart section 20 can be used as a normal shopping cart (refer to FIGS. 5 and 6).

The cart section 20 includes a base frame 30 by which the shopping cart 10 can be moved smoothly on the floor surface, a handle frame section 40 vertically provided at a rear wheel side of the base frame 30, and a basket receiving section 50 provided from a middle part of the handle frame section 40 toward the front side. The shopping basket P can be placed on the base frame 30 and the basket receiving section 50. The shopping basket P has a pair of swingable handles Pa.

The base frame 30 includes a frame 31 having a square frame shape, the rear side of which is open, and casters 32 respectively provided at four corners of the frame 31. The casters 32 include brackets 32a freely rotatable around vertical axes and wheels 32b made of rubber or resin freely rotatable in the horizontal direction in the brackets. A placing section 33 made of a thin frame material is provided on the frame 31. The placing section 33 is formed in dimensions for allowing a bottom part of the shopping basket P to fit in the placing section 33. A contact section 34 is formed at the distal end of the placing section 33. The contact section 34 has a function of supporting the shopping basket P on the placing section 33 and, keeping an interval between the shopping carts 10 if a plurality of shopping carts 10 are stacked such that the contact section 34 comes into contact with the base frame 30 of the shopping cart 10 stacked at the front side by pushing the shopping cart 10 in a forward (stacking) direction.

A restricting plate 35 is bolted to the placing section 33. The restricting plate 35 can be detachable according to necessity. A dimension "δ" along the front-rear direction of the restricting plate 35 is determined as described below.

The handle frame section 40 includes vertical frames 41 respectively attached to the casters 32 at the rear side and a horizontal handlebar 42 connecting the upper ends of the vertical frames 41. An extended arm 43 is attached to the vertical frame 41 at the left side. A reinforcing material 44 is provided to the handle frame section 40.

The basket receiving section 50 includes a frame 51 formed in a square frame shape and a receiving section 52 provided at the lower side of the frame 51. The receiving section 52 is formed in dimensions for allowing the bottom part of the shopping basket P to fit in the receiving section 52 as described above. The restricting plate 35 is fixed to the receiving section 52.

The electrical unit 100 is provided above the base frame 30. A battery unit 110 arranged between the vertical frames 41 at the lower end of the handle frame section 40 and a scanner 120 for reading a commodity code are provided. The electrical unit 100 includes a display 150 for displaying various kinds of information such as a commodity name and a unit price of a commodity read by the scanner 120 and a camera 160 for capturing an image of the inside of the shopping basket P. The battery unit 110 supplies electric power to the scanner 120, the display 150, and the camera 160 via a power line incorporated in the handle frame section 40. The scanner 120, the display 150, and the camera 160 are connected to one another by cables incorporated in the handle frame section 40 and the extended arm 43. The display 150 is attached to the upper end of the extended arm 43. The camera 160 is attached to a middle part of the extended arm 43. A shopping cart functioning as a register that reads a commodity code of a commodity a customer wants to buy is configured by these components described above.

As illustrated in FIG. 1, the scanner 120 includes a clamp 121 detachably attached to the handlebar 42 and, a scanner body 122 integrally attached to the clamp 121.

The display 150 includes a display panel 152 having a touch panel function. The display panel 152 is provided on a front surface of a terminal housing 151. A control section 200 for controlling the battery unit 110, the scanner 120, the display 150, and the camera 160 is provided in the terminal housing 151. The camera 160 and the display 150 are arranged at a forward and outward location from the handlebar 42.

A determining method for a dimension along the front-rear direction of the restricting plate 35 is described. The restricting plate 35 prevents the scanners 120, the displays 150, the casters 32, and the like from interfering with one another in the front-rear direction if the shopping carts 10 are stacked. Since the length in the front-rear direction of the display 150 is the largest as illustrated in FIG. 3, a distance, i.e., a dimension "α", is determined such that the displays 150 do not interfere with each other.

On the other hand, before the battery unit 110, the scanner 120, the display 150, and the camera 160 are mounted on the shopping cart 10, as illustrated in FIG. 5, a distance, i.e., a dimension "β" prevents the casters 32 of the shopping carts 10 from interfering with each other in the front-rear direction. Therefore, after the battery unit 110, the scanner 120, the display 150, and the camera 160 are mounted on the shopping cart 10, a dimension "δ" is defined as a difference between the dimension "α" and the dimension "β". The dimension "α" is determined on the basis of lengths along the front-rear direction, shapes, and mounting positions of the battery unit 110, the scanner 120, the display 150, and the camera 160. Therefore, the dimension "δ" is also a value determined on the basis of the lengths along the front-rear direction, the shapes, and the mounting positions of the battery section 110, the scanner 120, the display 150, and the camera 160.

The shopping cart 10 configured in this way is used as described below. In FIGS. 2 and 3, since the plurality of shopping carts 10 are shown, the shopping cart at the front side is referred to as a shopping cart 10A, the shopping cart at the rear side is referred to as a shopping cart 10B, and the shopping cart further at the rear side is referred to as a shopping cart 10C. The plurality of shopping carts 10 (10A, 10B, and 10C) are disposed in a row in a stacked manner at an entrance of the store. As illustrated in FIG. 2, the base frame 30 of the shopping cart 10B at the rear side is pushed in forward from the rear side of the base frame 30 of the shopping cart 10A located at the front side. Since a frame is not provided at the rear side of the base frame 30 of the shopping cart 10, the base frame 30 of the shopping cart 10B is inserted through the rear side of the base frame 30 of the shopping cart 10A. At this time, the maximum height of the base frame 30 from the ground (maximum ground height) is the top part of the contact section 34. However, the base frame 30 does not interfere with the battery unit 110. The basket receiving section 50 of the shopping cart 10B also overlaps the basket receiving section 50 of the shopping cart 10A passing between the vertical frames 41.

Similarly, as illustrated in FIG. 3, the shopping cart 10C is also pushed toward the front side. Consequently, an accommodating efficiency of the entire shopping carts 10 can be improved.

As illustrated in FIG. 3, the displays 150 are set on the shopping carts 10, respectively. Therefore, it is necessary to separate the display 150 along the front-rear direction by the dimension "α" in FIG. 3 to prevent the displays 150 mounted on the shopping carts 10 in the front-rear direction from interfering with each other. The dimension, i.e., distance "α", is secured by the restricting plate 35.

Since the shopping cart 10 is configured in this way, the mounted electrical components (the battery units 110, the scanners 120, the displays 150, and the camera 160) do not interfere with one another and thus are not broken even if the plurality of shopping carts 10 are stacked. A general shopping cart on which electrical components are not mounted is equivalent to the cart section 20 of the shopping cart 10. Therefore, the shopping cart can be used as the shopping cart 10 simply by attaching the electrical components and the restricting plate 35 thereto. It is unnecessary to prepare a special shopping cart. Therefore, the existing shopping cart can be diverted as the shopping cart 10. A manufacturing cost of the shopping cart 10 can be reduced.

In the embodiment described above, the restricting plate 35 functioning as the restricting member is provided on the base frame 30. However, the restricting plate 35 may be provided on a portion other than the base frame 30 if the restricting plate 35 can restrict the interval between the shopping carts 10 in the front-rear direction. For example, as illustrated in FIG. 3, a restricting protrusion section 45 is provided on the vertical frame 41 to adjust the interval between the shopping carts 10 by contacting the restricting protrusion section 45 with the vertical frame 41 of the shopping cart 10 located in front thereof.

While certain embodiments have been described above, these embodiments are presented by way of example only, and are not intended to limit the scope of the invention. The novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A stackable handcart comprising:
a cart frame including a receiving portion on which a shopping basket is placeable and a front end portion configured to abut a first stackable handcart having a same configuration as the stackable handcart when the stackable handcart is stacked with the first stackable handcart from behind the first stackable handcart;
a display attached to the cart frame; and
a restriction member attached to the cart frame at a position to abut a front end portion of a second stackable handcart having a same configuration as the stackable handcart when the second stackable handcart is stacked with the stackable handcart from behind the stackable handcart, the restriction member being configured to prevent the front end portion of the stacked second stackable handcart from proceeding forward beyond a rear end of the restriction member, the restriction member being positioned such that a display of the second stackable handcart does not abut the display of the stackable handcart when the front end portion of the second stackable handcart abuts the restriction member.

2. The stackable handcart according to claim 1, wherein the restriction member is below the display in a height direction.

3. The stackable handcart according to claim 1, wherein the restriction member thereof is behind the front end portion in a front-to-rear direction.

4. The stackable handcart according to claim 1, wherein the front end portion abuts the shopping basket when the shopping basket is placed in the receiving portion thereof.

5. The stackable handcart according to claim 1, wherein the cart frame further includes a display mounting arm extending upward, and the display is attached to the display mounting arm.

6. The stackable handcart according to claim 5, wherein the display mounting arm is disposed at a left or right end region of the cart frame.

7. The stackable handcart according to claim 1, further comprising:
a camera mounted on the cart frame at a position below the display, wherein
the restriction member is positioned such that a camera of the second stackable handcart does not abut the camera of the stackable handcart when the front end portion of the second stackable handcart abuts the restriction member.

8. The stackable handcart according to claim 7, wherein the camera is directed to capture a region including an inner space of the shopping basket.

9. The stackable handcart according to claim 1, further comprising:
a code reader attached to the cart frame, wherein
the restriction member is positioned such that a code reader of the second stackable handcart does not abut the code reader of the stackable handcart when the front end portion of the second stackable handcart abuts the restriction member.

10. The stackable handcart according to claim 9, wherein the cart frame further includes a handle portion disposed at a rear end region of the cart frame, and
the code reader is mounted on the handle portion.

11. The stackable handcart according to claim 1, wherein the restriction member comprises a plate.

12. A stackable handcart comprising:
a cart frame including a receiving portion on which a shopping basket is placeable and a front end portion that abuts a first stackable handcart having a same configuration as the stackable handcart when the stackable handcart is stacked with the first stackable handcart from behind the first stackable handcart;
a code reader attached to the cart frame; and
a restriction member attached to the cart frame at a position to abut a front end portion of a second stackable handcart having a same configuration as the stackable handcart when the second stackable handcart is stacked with the stackable handcart from behind the stackable handcart, the restriction member being configured to prevent the front end portion of the stacked second stackable handcart from proceeding forward beyond a rear end of the restriction member, the restriction member being positioned such that a code reader of the second stackable handcart does not abut the code reader of the stackable handcart when the front end portion of the second stackable handcart abuts the restriction member.

13. The stackable handcart according to claim 12, wherein the restriction member is below the display in a height direction.

14. The stackable handcart according to claim 12, wherein the restriction member thereof is behind the front end portion in a front-to-rear direction.

15. The stackable handcart according to claim 12, wherein the front end portion abuts the shopping basket when the shopping basket is placed in the receiving portion thereof.

16. The stackable handcart according to claim 12, wherein the cart frame further includes a handle portion disposed at a rear end region of the cart frame, and
the code reader is mounted on the handle portion.

17. The stackable handcart according to claim 12, further comprising:

a camera mounted on the cart frame at a position below the display, wherein the restriction member is positioned such that a camera of the second stackable handcart does not abut the camera of the stackable handcart when the front end portion of the second stackable handcart abuts the restriction member.

18. The stackable handcart according to claim 17, wherein the camera is directed to capture a region including an inner space of the shopping basket.

19. The stackable handcart according to claim 12, wherein the restriction member comprises a plate.

\* \* \* \* \*